United States Patent [15] 3,659,157

Nagasawa [45] Apr. 25, 1972

[54] ULTRAVIOLET PHOTOCONDUCTIVE CELL AND A METHOD FOR MAKING THE SAME

[72] Inventor: Masahiro Nagasawa, Osaka, Japan

[73] Assignee: Matsushita Electric Industrial Co. Ltd., Osaka, Japan

[22] Filed: Dec. 29, 1970

[21] Appl. No.: 102,420

[52] U.S. Cl. ....................317/234 R, 317/235 N, 317/238, 317/237, 250/83.3 UV, 136/89, 148/186, 250/211

[51] Int. Cl. ....................H01l 15/00

[58] Field of Search ....................317/235 N, 238, 237; 250/211 J, 83.3 UV; 136/89; 148/186

[56] References Cited

UNITED STATES PATENTS

| | | | |
|---|---|---|---|
| 3,418,473 | 12/1968 | Blue | 250/83.3 |
| 3,416,044 | 12/1968 | Dreyfus | 317/234 |
| 3,520,732 | 7/1970 | Nakayama | 136/89 |
| 3,551,870 | 12/1970 | Reynolds | 338/15 |

*Primary Examiner*—John W. Huckert
*Assistant Examiner*—Martin H. Edlow
*Attorney*—Wenderoth, Lind & Ponack

[57] ABSTRACT

An ultraviolet photoconductive cell. The cell has a stannic oxide body heated in a gaseous atmosphere having a partial oxygen pressure of more than 5 kg./cm$^2$. Two electrodes are applied to one surface of said stannic oxide body. The cell has a high photosensitivity and also a high response speed with respect to an ultraviolet light signal.

6 Claims, 3 Drawing Figures

Patented April 25, 1972 3,659,157

INVENTOR
MASAHIRO NAGASAWA

BY Wenderoth, Lind & Ponack
ATTORNEYS

ULTRAVIOLET PHOTOCONDUCTIVE CELL AND A METHOD FOR MAKING THE SAME

This invention relates to a photoconductive cell comprising a photoconductive stannic oxide body which is sensitive to ultraviolet light and has a high response speed thereto, and to a method for making the same.

It is well known in the art that a lot of semiconductors and insulators exhibit photoconductivity when irradiated with light of some characteristic wavelength. For most of them this characteristic wavelength is in the visible or ultrared region. On the other hand, contrary to photoconductive materials which are sensitive to visible and ultrared light, photoconductive materials sensitive to ultraviolet light can be used in a lighted room without being shielded from visible light. Only a few materials, for example zinc sulfide and zinc oxide, are known to be photosensitive to light having a characteristic wavelength in the ultraviolet region. Zinc sulfide has very high electrical resistivity even when irradiated with ultraviolet light, and is not always suitable for practical use. Zinc oxide is utilized in the art as an ultraviolet photoconductive material, for example, in electrography. It is known, however, that the photoconductivity process of zinc oxide includes a slow response component which is believed to arise from the interaction between the surface thereof and oxygen gas in the atmosphere, as described in R.H. Bube, "Photoconductivity of Solids" (John Wiley & Sons, Inc., New York, 1960) pp. 194–196. Therefore zinc oxide is not suitable for use in a fast response device such as a photoconductive cell.

Stannic oxide is known in the art as a semiconductive material of the N-type having a high electrical conductivity. The origin of the conductivity is believed to be native defects resulting from non-stoichiometry of the material, i.e. oxygen vacancies and/or interstitial tin ions. It is also known that stannic oxide doped with acceptor impurities such as cadmium has a relatively high electrical resistivity and exhibits photoconductivity when irradiated with ultraviolet light. Such a charge-compensated stannic oxide contains a large amount of trapping centers, and photoelectric process thereof includes an extremely slow component of the order of $10^2$ sec. or more. In addition, its electrical resistivity is apt to change permanently because of slight heating or continuous irradiation by light.

The electronic industry has long had a need for an ultraviolet light sensitive photoconductive material having a high response speed and good stability.

An object of the present invention is to provide an ultraviolet light sensitive photoconductive cell having a high response speed and good stability.

Another object of the present invention is to provide a method for making an ultraviolet light sensitive photoconductive material having a high response speed and good stability. These objects are achieved by providing an ultraviolet photoconductive cell which has a stannic oxide body which has been heated in a gaseous atmosphere having a partial oxygen pressure of more than 5 kg/cm$^2$. Two electrodes are applied to one surface of the stannic oxide body. The cell has a high photosensitivity and also a high response speed with respect to an ultraviolet light signal.

Other and further features of this invention will be apparent from the following detailed description taken together with the accompanying drawings, wherein.

Figure 1:
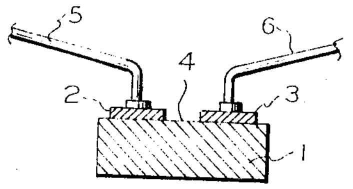
FIG. 1 is a cross-sectional view of a photoconductive cell made of a photoconductive material according to the invention.

The ultraviolet photoconductive cell according to the present invention comprises a stannic oxidy body 1 which has been heated in a gaseous atmosphere having a partial oxygen pressure of more than 5 kg/cm$^2$ at a temperature not less than 700° C and two electrodes 2 and 3 applied to one surface 4 of said stannic oxide body at points spaced from each other. Leads 5 and 6 are connected to the respective electrodes.

A method for making an ultraviolet photoconductive material according to the present invention comprises heating a stannic oxide body in a gaseous atmosphere having a partial oxygen pressure of more than 5 kg/cm$^2$.

Said stannic oxide body can be in any available form such as single crystals, polycrystalline bodies, films, and powders. The best ultraviolet photoconductive material is obtained by using stannic oxide in the form of a single crystal. Other materials which produce stannic oxide at high temperature such as meta stannic acid are also useable as a starting material. For thin films, a substrate material must be provided which is chemically inactive with respect to stannic oxide even at elevated temperatures. An example of a desirable substrate material is fused quartz of high purity. It is preferable that said stannic oxide body have a relatively high purity of, for example, 99.8 mol percent or more. A small amount of acceptor impurities such as elements in groups II and III of the periodic table do not spoil the resultant properties. Antimony as an impurity, on the other hand, has a significant effect on the resultant properties; the photosensitivity of the resultant material is generally very poor. It is preferable that the amount of antimony included in said stannic oxide body be less than 0.05 mol percent.

Said stannic oxide body in any suitable form is placed in a crucible made of a high purity refractory material such as fused quartz, alumina or platinum. The crucible is placed into a high pressure furnace, which is then filled with high pressure gas containing oxygen gas. Said stannic oxide body in the crucible is heated at an elevated temperature above 700° C for a period ranging from 20 minutes to 48 hours. After being cooled down to room temperature, said high pressure gas is allowed to leak out of the high pressure furnace.

The heat treatment of said stannic oxide body can be carried out by using any suitable and available pressure furnace such as metal-pressure-vessel having an induction heater or an internal heater made of a non-oxidizable material such as a platinum-rhodium alloy, or an alumina-pressure-vessel having an external heater.

Said high pressure gas must have a partial oxygen pressure of more than 5 kg/cm$^2$. It has been discovered according to the present invention that oxygen gas of more than 5 kg/cm$^2$ provides the stannic oxidy body with high dark-resistivity, high photosensitivity and fast response speed when it is used as a photoconductive material. The oxygen gas at a high pressure acts to decrease the oxygen vacancies in the crystal lattice of the stannic oxide and also to supress the vaporiaztion of stannic oxide at high temperatures. Said high pressure gas can be essentially oxygen gas or a mixture of oxygen gas and other inactive gases such as nitrogen, carbon dioxide, argon, and helium. Reducing gases such as hydrogen and carbon monoxide should be avoided. The oxygen gas at a pressure of less than 5 kg/cm$^2$ does not achieve the above effects to any significant degree. Above 5 kg/cm$^2$ a higher oxygen pressure produces better results. There is, in principle, no upper limit for the operable oxygen pressure.

The lower limit of the heating temperature according to the invention is 700° C. In general, lower heating temperature requires higher oxygen pressure and/or a longer heating time to obtain the desired results. Stannic oxide in massive form such as single crystals and polycrystalline bodies requires a very long heating period, for example, more than 48 hours at a low temperature, for example, below 1,000° C. The higher temperature permits use of a shorter heating period. For example, a heating temperature of 1,600° C requires a heating period of 20 minutes to produce an excellent ultraviolet photoconductive material.

The photosensitivity and the response time of a photoconductive material according to the invention is examined in the following way. A photoconductive cell is constructed by using a photoconductive material according to the invention. An example of such a photoconductive cell is illustrated in FIG. 1. The photoconductive material 1 has the two electrodes 2 and 3 being separated from each other. Said two electrodes 2 and 3 are applied by any suitable and available method such as vacuum deposition of a metal or painting of an electrically conductive paste in a well known manner. The two electrical leads 5 and 6 are connected conductively to the respective electrodes 2 and 3 by any suitable and available method, for example, soldering or welding, or by using an electrically conductive adhesive paste. When the photoconductive material according to the invention is in the form of powder, a quartz plate having two electrodes on the surface thereof is used as a substrate. The photoconductive powder is mixed with a binder material, such as epoxy resin in a solvent, and the mixture is applied to said surface to bridge said two electrodes and is adhered to said substrate and said two electrodes by curing the epoxy resin. It is preferable to keep the amount of binding material as low as possible in order to increase the contact points among the particles of photoconductive powder. A series circuit of a photoconductive cell according to the invention and a resistor of, for example 1,000 ohms, is supplied with a DC voltage from a battery. The voltage across said series resistor, which is proportional to the current flowing through the cell, is displayed vertically on a conventional oscilloscope. Light from an ultraviolet light source, such as a mercury lamp, is focused on the surface 4 of the photoconductive cell between the electrodes 2 and 3. Said light is interrupted by using a conventional rotary sector. The time sequence of current flows through the photoconductive cell when it is illuminated and when it is not can be directly observed on the oscilloscope. In some cases a conventional DC pen-recorder can be used instead of an oscilloscope.

Figure 2:
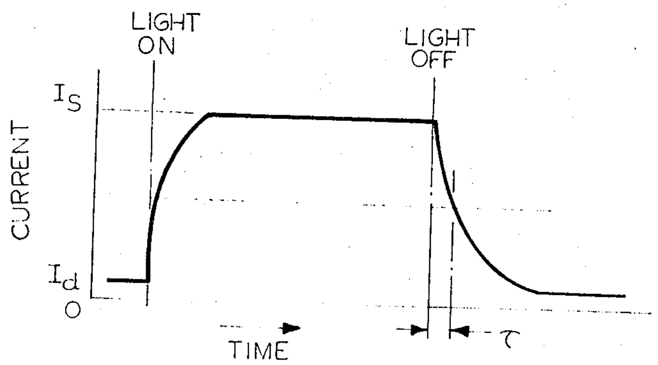
FIG. 2 is a current-time graph showing the time-response behavior of a photoconductive material according to the invention.

A curve showing the time sequence of the current flow through a photoconductive cell according to the invention is represented in FIG. 2. The current in the absence of light ($I_d$) is very small, typically on the order of $10^{-6}$ amp. It increases exponentially with time when the photoconductive cell is exposed to ultraviolet light and reaches a saturation value ($I_s$) which is typically on the order of $10^{-3}$ amp, and decreases exponentially down to $I_d$ when the irradiation is cut off. The decay process is generally slower than the build-up process. The ratio $I_s/I_d$ is a measure of the photosensitivity of the photoconductive material. The current decay process is characterized in terms of a time constant $\tau$ which is defined as the time the photocurrent takes to decrease from $I_s$ to $(I_s-I_d)/2$. The inverse of $\tau$ represents the relative response speed of the photoconductive material with respect to a light signal. The photoconductive material according to the invention has a high photosensitivity ($I_s/I_d$), typically on the order of $10^3$. It also has a small time constant, typically on the order of $10^{-3}$ sec.

Figure 3:
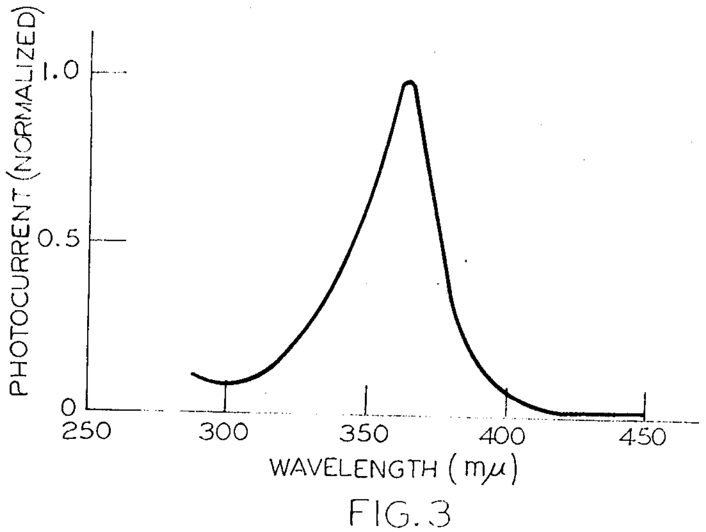
FIG. 3 is a plot of photocurrent vs. wavelength showing the spectral dependence of a photoconductive material according to the invention.

FIG. 3 shows the spectral dependence of the photocurrent of a photoconductive cell constructed by using a photoconductive material according to the invention. As is seen, the photoconductive material according to the invention is sensitive only to ultraviolet light and has a maximum photosensitivity for light having a wavelength of 365 millimicrons. The characteristic wavelength coincides preferably with that of the most intense emission line of a mercury lamp.

An ultraviolet photoconductive material according to the invention has a high photosensitivity and also a high response speed. It has many applications similar to those of photoconductive materials which are well known in the art. It is especially suitable for use in electro-optical devices which are equipped with a mercury lamp.

EXAMPLE 1

A stannic oxide single crystal having a purity of more than 99.95 percent and a resistivity of about 0.2 ohm-cm was cut into a rectangular bar having a dimension of about 2×1×0.5 $mm^3$. The specimen was placed in a platinum crucible and the crucible was placed into a high pressure furnace having a pressure vessel made of sintered alumina and an external heater. The pressure vessel was filled with oxygen gas at 10 $kg/cm^2$. A pressure controlling valve was used for the purpose of obtaining a constant gas pressure. The specimen was heated at 1,300° C for 28 hrs. The photoconductive properties are shown in the Table. The photosensitivity and time constant were measured for a photoconductive cell constructed by using the specimen, and ultraviolet light from a 100 W high pressure mercury lamp (Toshiba Electric Co., Ltd., Japan) placed 60 cm from the cell was used.

EXAMPLE 2

The specimen of this example was similar to that of Example 1. A high pressure furnace having a metal pressure vessel and an internal heater made of a platinum-rhodium alloy was used. The heat treatment was carried out at 1,000° C for 10 hours at an oxygen gas pressure of 50 $kg/cm^2$. The photoconductive properties are shown in the Table.

EXAMPLE 3

The specimen of this example was similar to that of Example 1. The furnace was the same as Example 2. A high pressure gas consisting of 5 $kg/cm^2$ oxygen gas and 20 $kg/cm^2$ nitrogen gas was used. The heat treatment was carried out at 1,600° C for 20 minutes. The photoconductive properties are shown in the Table.

EXAMPLE 4

The specimen of the Example was a stannic oxide film having a thickness of about 0.5 micron which was formed on a fused-quartz substrate by using a conventional spraying method. The purity of the film was more than 99.8 percent. The specimen was heated at 700° C for 8 hours under an oxygen gas pressure of 20 $kg/cm^2$ by the same method as Example 1. The photoconductive properties are shown in the Table.

EXAMPLE 5

The specimen of the Example was similar to that of Example 4. The specimen was heated at 1,000° C for 2 hours in an oxygen gas at a pressure of 5 $kg/cm^2$ by the same method as Example 1. The photoconductive properties are shown in the Table.

TABLE

| Example | Dark Resistivity | Photosensitivity ($I_s/I_d$) | Time Constant ($\tau$) |
|---|---|---|---|
| 1 | $1\times10^{11}$ ohm-cm. | $1\times10^3$ | 50 mesc |
| 2 | $2\times10^{9}$ ohm-cm. | $2\times10^2$ | 120 mesc |
| 3 | $7\times10^{10}$ ohm-cm. | $2\times10^3$ | 8 mesc |
| 4 | $6\times10^{7}$ ohm/sq. | 17 | 250 mesc |
| 5 | $5\times10^{7}$ ohm/sq. | 50 | 35 mesc |

What is claimed is:

1. An ultraviolet light sensitive photoconductive cell comprising a stannic oxide body which has been heated in a gaseous atmosphere having a partial oxygen pressure of more than 5 $kg/cm^2$ at a temperature not less than 700° C, and two electrodes applied to one surface of said stannic oxide body at points spaced from each other.

2. A photoconductive cell as claimed in claim 1 wherein said stannic oxide body is in the form of a single crystal.

3. A method for making an ultraviolet light sensitive photoconductive material comprising heating a stannic oxide body in a gaseous atmosphere having a partial oxygen pressure of more than 5 $kg/cm^2$.

4. A method as claimed in claim 3 wherein said stannic oxide body is in the form of a single crystal.

5. A method as claimed in claim 3 wherein the heating temperature is not less than 700° C.

6. A method as claimed in claim 5 wherein the heating temperature is not less than 1,000° C.

* * * * *